(12) United States Patent
Gaige et al.

(10) Patent No.: US 10,158,711 B2
(45) Date of Patent: Dec. 18, 2018

(54) WEBSITE FRAMEWORK

(71) Applicant: Hewlett Packard Enterprise Development LP, Houston, TX (US)

(72) Inventors: Yves Gaige, Grenoble (FR); Remi Verney, Grenoble (FR); Yann Stephan, Grenoble (FR)

(73) Assignee: Hewlett Packard Enteprise Development LP, Houston, TX (US)

(*) Notice: Subject to any disclaimer, the term of this patent is extended or adjusted under 35 U.S.C. 154(b) by 242 days.

(21) Appl. No.: 15/310,901

(22) PCT Filed: Jan. 15, 2015

(86) PCT No.: PCT/US2015/011549
§ 371 (c)(1),
(2) Date: Nov. 14, 2016

(87) PCT Pub. No.: WO2016/014112
PCT Pub. Date: Jan. 28, 2016

(65) Prior Publication Data
US 2017/0093973 A1    Mar. 30, 2017

(30) Foreign Application Priority Data
Jul. 25, 2014    (EP) .................................... 14178638

(51) Int. Cl.
*G06F 15/16*   (2006.01)
*H04L 29/08*   (2006.01)
*G06F 17/30*   (2006.01)

(52) U.S. Cl.
CPC ...... *H04L 67/1095* (2013.01); *G06F 17/3089* (2013.01); *G06F 17/30896* (2013.01);
(Continued)

(58) Field of Classification Search
CPC ................. H04L 29/0809; H04L 67/02; G06F 17/30607; G06F 17/30613–17/30619; G06F 17/30625; G06F 17/30861; G06F 17/3089–17/30896; G06F 17/30943–17/30946
See application file for complete search history.

(56) References Cited

U.S. PATENT DOCUMENTS 6,701,459 B2  3/2004  Ramanathan et al.
6,704,729 B1  3/2004  Kleing et al.
(Continued)

OTHER PUBLICATIONS

Childs S., et al., "Devolved Management of Distributed Infrastructures With Quattor", San Diego, CA: USENIX Association, Nov. 9-14, 2008, 23 pages.
(Continued)

*Primary Examiner* — Brendan Y Higa
(74) *Attorney, Agent, or Firm* — Samson & Partner

(57) ABSTRACT

Techniques for hosting websites are disclosed. At least aspects of a website are defined in a framework of website resources. The at least aspects of the website are dependent on the website resources and their position in the framework. In response to a request concerning the website, the framework is parsed to determine at least one of the website resources for the request. A response to the request is provided in dependence on the at least one website resource.

15 Claims, 10 Drawing Sheets

(52) U.S. Cl.
CPC ........ *G06F 17/30946* (2013.01); *H04L 67/02* (2013.01); *H04L 67/1097* (2013.01)

(56) References Cited

U.S. PATENT DOCUMENTS

| | | | |
|---|---|---|---|
| 8,131,850 | B2 | 3/2012 | Kuo et al. |
| 8,930,804 | B2 * | 1/2015 | Vora .................. G06F 17/30864 715/205 |
| 2005/0165766 | A1 | 7/2005 | Szabo |
| 2006/0095430 | A1 | 5/2006 | Zeng et al. |
| 2007/0028162 | A1 * | 2/2007 | Griffin ................ G06F 17/3089 715/235 |
| 2007/0244884 | A1 * | 10/2007 | Yang ................. G06F 17/30864 |
| 2008/0189162 | A1 | 8/2008 | Ganong et al. |
| 2009/0282032 | A1 | 11/2009 | Lie et al. |
| 2013/0114105 | A1 * | 5/2013 | Liu .................. G06F 17/30864 358/1.15 |
| 2013/0198641 | A1 * | 8/2013 | Brownlow ............ G06F 3/0485 715/738 |
| 2013/0262427 | A1 | 10/2013 | Parsana et al. |

OTHER PUBLICATIONS

International Searching Authority, "Notification of Transmittal of the International Search Report and the Written Opinon", PCT/US2015/011549, dated Apr. 1, 2015 14 pages.

Losee, R., et al, "Literature Review", Kiduk Yang School of Information and Library Science, University of North Carolina, Jan. 2001, 158 pages.

Unknown, "Deme Architecture", GitHub Repository, Jul. 1, 2013, 15 pages.

* cited by examiner

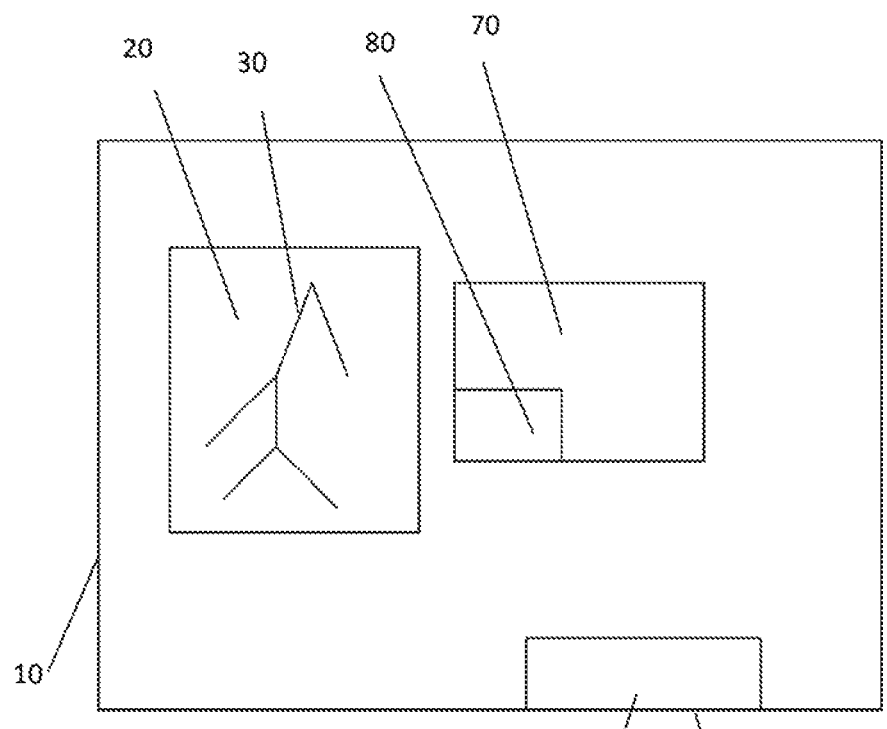
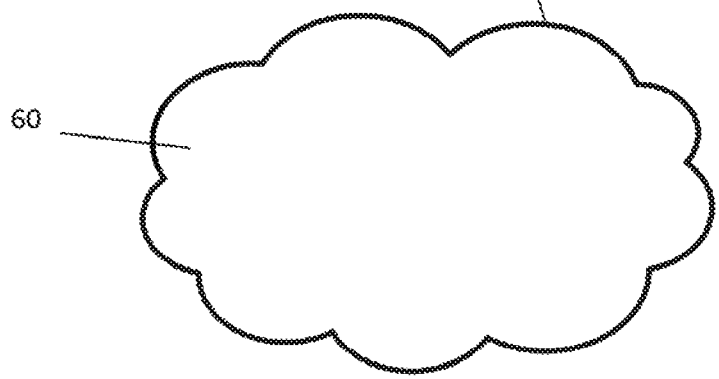
FIG. 1

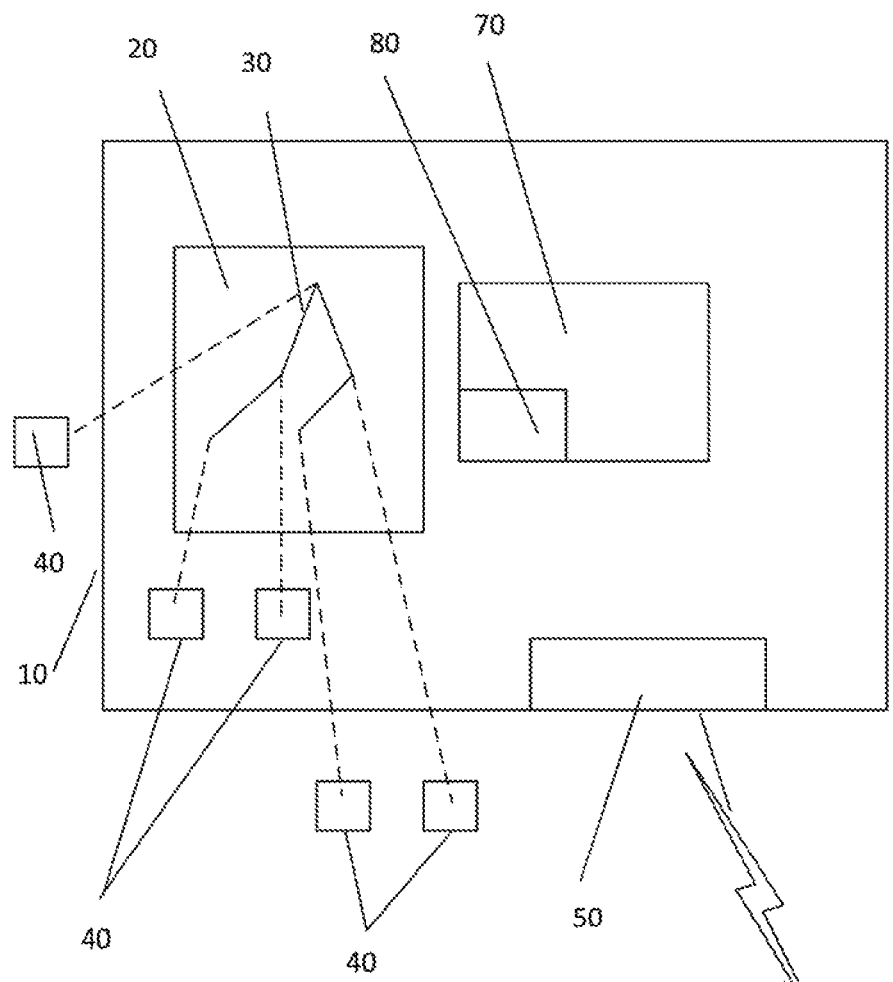
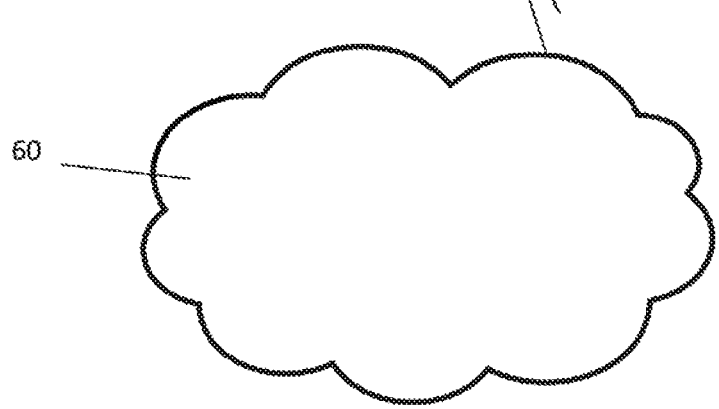
FIG. 2

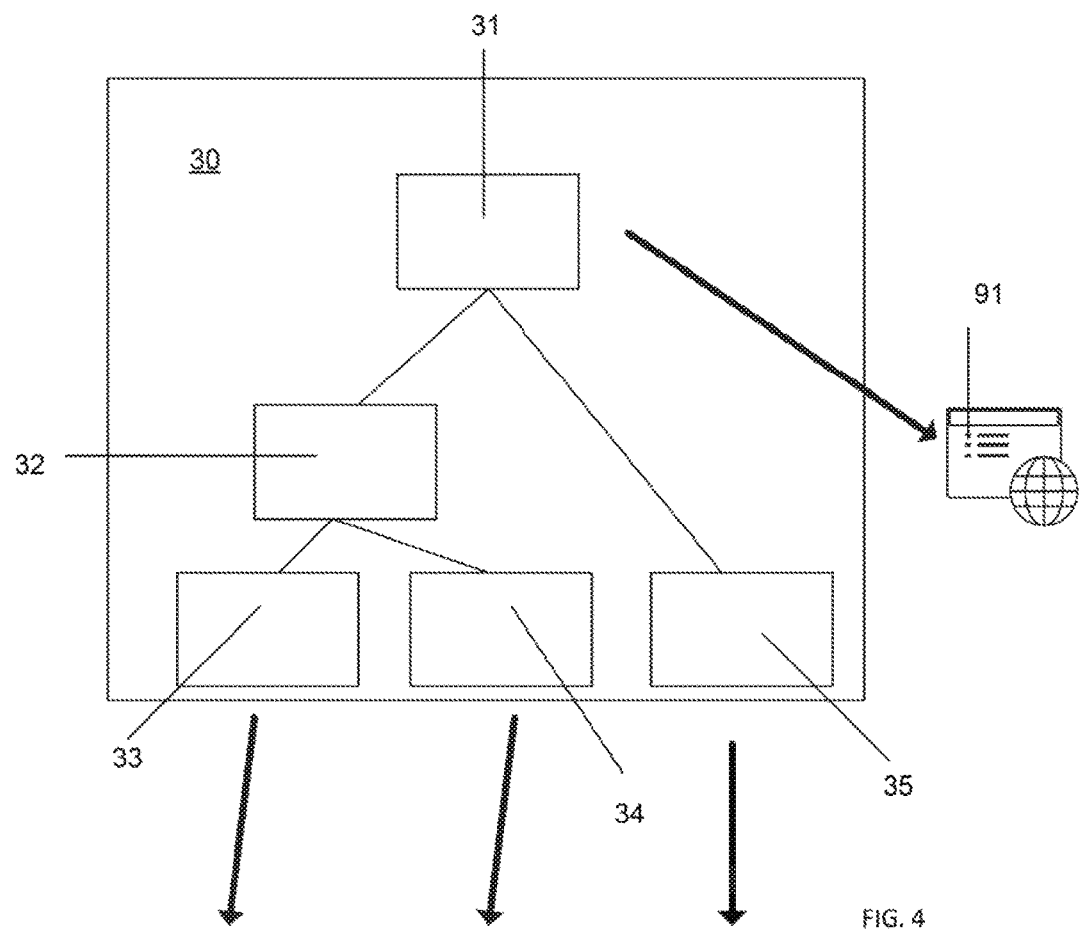
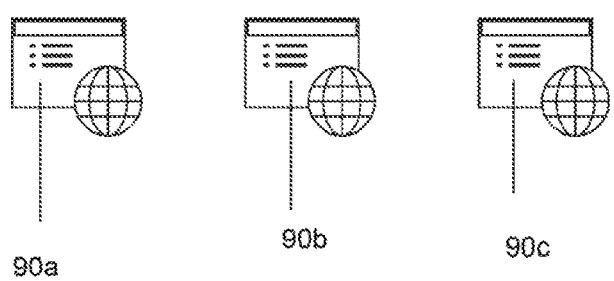
FIG. 4

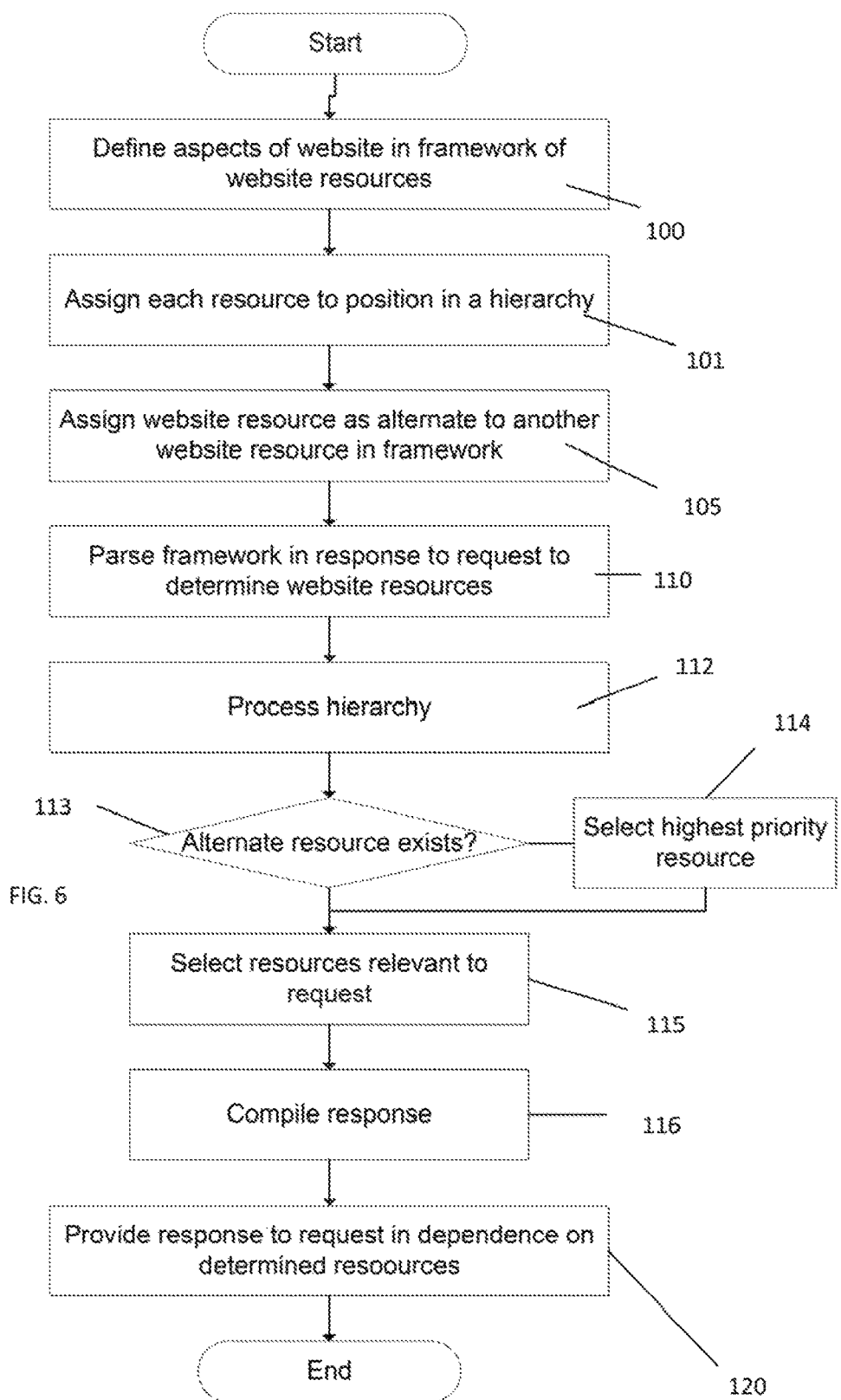

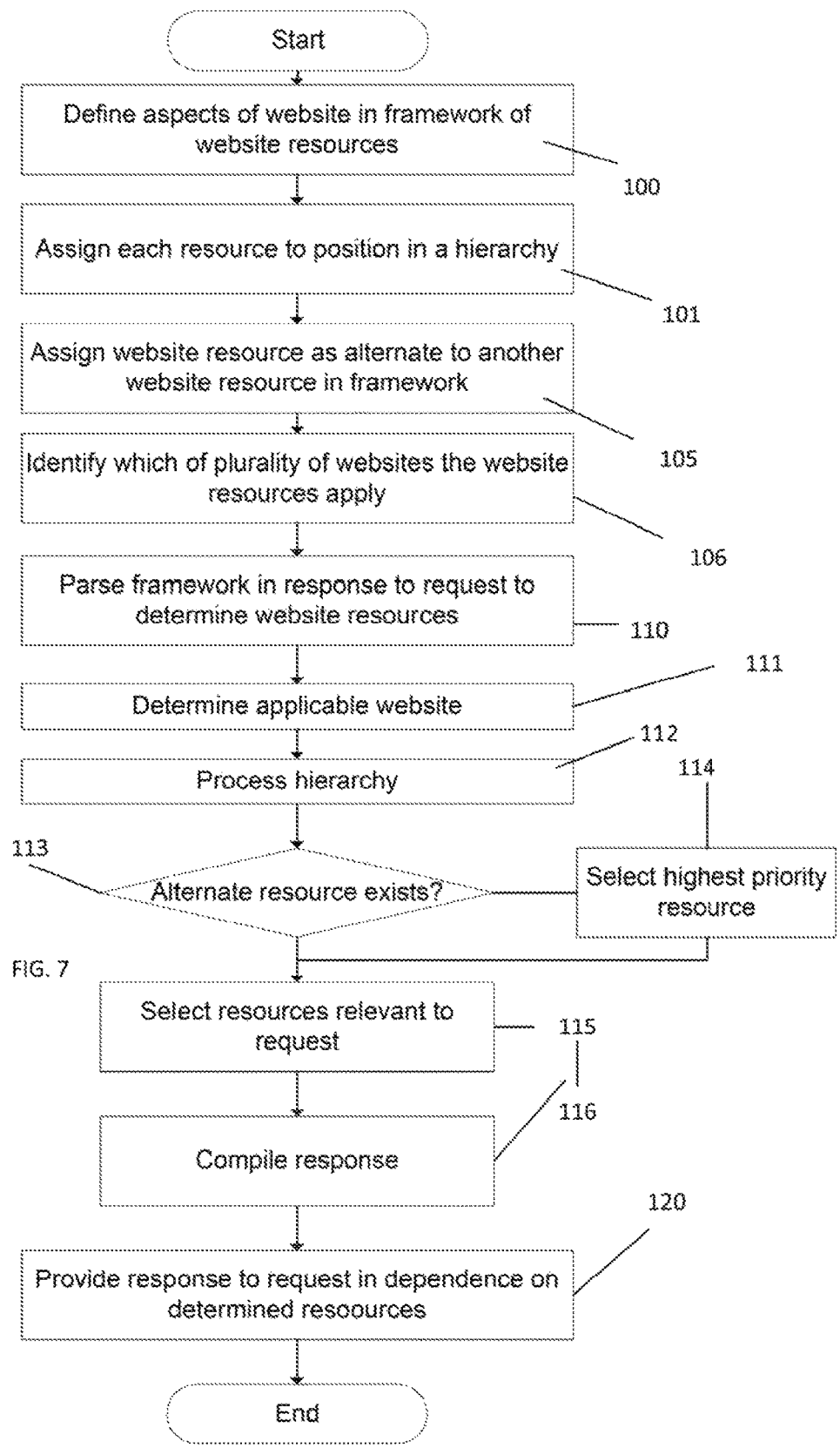

WEBSITE FRAMEWORK

BACKGROUND

Websites are hosted by web servers. A web server receives a request concerning for a website and provides a response, often in the form of content such as a web page that can be rendered at a receiving client. Websites can be written in different languages and may be defined by markup language such as hypertext markup language, HTML, and cascaded style scripts, CSS. Websites may also include media such as images, sound clips and video and executable code such as Javascript.

BRIEF DESCRIPTION OF THE DRAWINGS

The accompanying drawmgs illustrate various examples and are a part of the specification. The illustrated examples are examples and do not limit the scope of the claims. Throughout the drawings, identical reference numbers designate similar, but not necessarily identical elements.

FIG. 1 is a block diagram illustrating a system to serve content of a website, according to various examples;

FIG. 2 is a block diagram illustrating a system to serve content of a website, according to various examples

FIG. 4 is a graphical representations of a website framework of the system of FIGS. 1 or 2, according to various examples;

FIG. 6 is a flow diagram of a method of hosting a website, according to various examples;

FIG. 7 is a flow diagram of a method of hosting a website, according to various examples;

The same part numbers designate the same or similar parts throughout the figures.

DETAILED DESCRIPTION

Figure 3A:
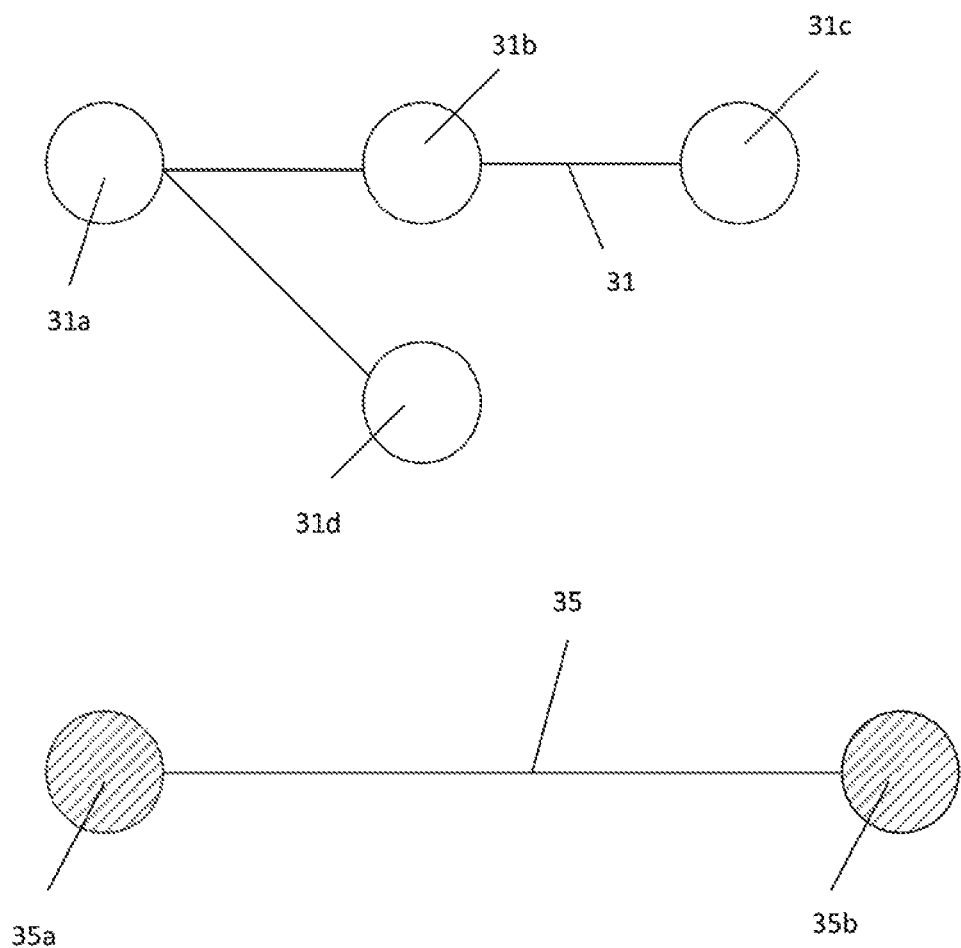
FIGS. 3a and 3b are graphical representations of a website framework of the system of FIGS. 1 or 2, according to various examples.

A website may combine, website resources such as, amongst others, multimedia, content, executable functions and access to externally hosted resources or services. A website may be defined in one language, or a mixture of languages.

One problem with hosting websites is that they can be difficult and time consuming to create and maintain. In certain websites, the various resources to be output are linked in computer readable code such as HTML to enable the receiving client to understand and render the website. As the size, such as the number of pages, of a website increases, amending the website such as its links to reflect changes becomes increasingly difficult. Changing a component or functionality of a website, such as an authentication system for checking website access rights or a payment processor, can also be a complex task.

Content Management Systems (CMS) have commonly been used to define and maintain websites. Content management systems commonly provide functionality such as navigation and content rendering for content that is stored in a database. A CMS splits the content of a website from the structure, style and functionality of the hosted website. A CMS commonly has a front end graphical user interface to allow aspects of the CMS and the content to be edited. However, the extent to which the structure, style and functionality of the CMS can be changed varies. Changes may need to be done at the code level which can be complex and require significant expertise.

Certain CMS's use templates to allow a user to change style and layout of a website by swapping one template for another. Modification of templates often requires editing of its code such as its cascaded style sheet, CSS, files. However, should the template be updated for bug fixes, those modifications are commonly lost and must be re-done.

A website may co-exist on a web server with other websites, each existing independently of other websites on the web server and having its own directory of files that define its content, structure, style and functionality. A web server commonly handles routing of requests to the correct one of multiple hosted websites by associating different port numbers with different websites and routing requests according to port or by having a proxy component initially receive requests that then routes requests based on the destination address or domain of the request. One difficulty with hosting multiple websites is that keeping all websites updated. Another difficulty is that maintaining a common brand or style across multiple websites that potentially have different content and structure requires care and attention to ensure necessary changes are made to each site.

Accordingly, various examples described herein were developed to provide methods, computer-readable media, and systems for defining and hosting websites. One method for hosting a website includes defining at least aspects of a website in a framework of website resources, the at least aspects of the website being dependent on the website resources and their position in the framework. In response to a request concerning the website, the framework is parsed to determine at least one of the website resources for the request and a response is provided to the request in dependence on the at least one website resource.

Examples described herein may enable vebsites to be defined in a framework that extends and/or changes a root website without requiring editing of the root website. The extensions and/or changes may not be restricted to a particular type and can include content, configuration, style, and functionality and may be provided by resources and services that are local or remote of a hosting web server.

A change to a website resource, of the root website takes effect on any website inheriting from the root website without any further changes being needed. A single change, patch or addition to the root website may therefore affect multiple websites. However, the change, patch or addition will not have any effect on changes or extensions made by the framework which has a superseding effect on the root website.

Multiple websites may inherit from a common root website, each of the multiple websites being able to be changed or extended independently of the root website or other hosted websites. For example, websites may have a common style and branding that is inherited from the root site but have different content or functionality. Multiple tenants may be collocated on a single web server instance whilst security and access rights can be divided (for example, a tenant may be given rights to change the portion of the website dictated by his or her framework but not to anything governed by the root website—however, given that the user's framework can override the root website, changed to the root website should not be necessary). Because the framework has a superseding effect, changes ca be simply be rolled back to that of the root website by removing whichever website resources had been specified to supersede it in the framework. This causes the website to revert to inheriting from the root website.

FIG. 1 is a block diagram illustrating a system to serve content of a website. FIG. 1 includes particular components, modules, etc. according to various examples. However, in different examples, more, fewer, and/or other components, modules, arrangements of components/modules, etc. may be used according to the teachings described herein. In addition, various components, modules, etc., described herein may be implemented as one or more electronic circuits, software modules, hardware modules, special purpose hardware (e.g., application specific hardware, application specific integrated circuits (ASICs), embedded controllers, hardwired circuitry, Field Programmable Gate Arrays (FPGA), etc.) or some combination of these.

As is shown in FIG. 1, the system 10 includes a data repository 20 encoding a website framework 30. In one example, the website framework 30 identifies a plurality of website resources. In one example, the website framework 30 also identifies the applicability of the website resources for a website. In one example, the system also includes a network interface 50 that is arranged to receive, from a network 60, a request for content of the website.

In one example, the system further includes a dispatcher 70 including at least one processor 80 to execute computer program code to receive the request for content from the network interface 50. In one example, the dispatcher 70 accesses the website framework 30 in the data repository 20 to determine, in dependence on the applicability identified by the website framework 30, at least one of the website resources corresponding to the request for content, and serves content in dependence on the determined website resource or resources.

FIG. 2 is a block diagram illustrating a system to serve content of a website. FIG. 3 includes particular components, modules, etc. according to various examples. However, in different examples, more, fewer, and/or other components, modules, arrangements of components/modules, etc. may be used according to the teachings described herein. In addition, various components, modules etc. described herein may be implemented as one or more electronic circuits, software modules, hardware modules, special purpose hardware (e.g., application specific hardware, application specific integrated circuits (ASICs), embedded controllers, hardwired circuitry, Field Programmable Sate Arrays (FPGA), etc.), or some combination of these.

As is shown in FIG. 2, the system 10 includes a data repository 20 encoding a website framework 30. In one example, the website framework 30 identifies a plurality of website resources 40. In one example, the website framework 30 also identifies the applicability of the website resources for a website 90. In one example, the website framework 30 comprises a hierarchy, each of the plurality of website resources 40 having a position in the hierarchy, the position of a website resource 40 in the hierarchy with respect to the other website resources defining the applicability of the website resource for the website.

In one example, the hierarchy has a plurality of levels, each level having a unique rank in the hierarchy. In one example, the position of each of the plurality of website resources 40 is one of the levels (in one example, multiple website resources 40 may have the same level). A website resource 40 in a higher ranked level has priority in applicability for the website over a website resource of a lower ranked level. In one example, a website resource is applicable for the website if no corresponding website resource at a higher ranked level exists in the hierarchy.

In one example, correspondence of website resources 40 may be determined by a file naming convention. For example, two resources may correspond if they share the same name or part of a name. For example, if there are two website resources named "login.js", the resource having the higher ranked level would be the one selected as being applicable. It will be appreciated that a different ranking scheme may be selected with priority being given differently than based on the relative measure of high or low.

In one example, correspondence may be defined in the website framework 30 by encoding a link or mark in the website framework 30 between corresponding website resources. The dashed lines in FIG. 2 illustrate the correspondence between the website framework 30 and the website resources 40. It will be appreciated that website resources themselves need not be part of the website framework 30 and may be hosted locally or remotely of the system 10 as shown in FIG. 2.

In one example, the system 10 also includes a network interface 50 that is arranged to receive, from a network 60, a request for content of the website.

In one example, the system 10 further includes a dispatcher 70 including at least one processor 80 to execute computer program code to receive the request for content from the network interface 50. In one example, the dispatcher 70 accesses the website framework 30 in the data repository 20 to determine, in dependence on the applicability identified by the website framework 30, at least one of the website resources 40 corresponding to the request for content. The dispatcher then serves, or causes serving of content in dependence on the determined website resource or resources 40.

In one example, the dispatcher 70 is a separate component to a web server engine running on the system 10. In one example, the web server engine is a nginx, jsnode, IIS or Apache web server engine that receives a request and directs it to the dispatcher 70 that determines website resources that define aspects of the website such as content, structure, style and/or functionality from the website framework 30 before returning a response to the request based on the website resources 40.

In one example, the dispatcher is part of, or a plug-in to, a web server engine such as a nginx, jsnode, IIS or Apache web server engine.

In one example, the served content may be, or include, elements renderable by a receiving web browser or other client. In one example, the served content may be or include elements executable or accessible by a receiving we browser or other client. In one example, the served content may be a mixture of content types. In one example, the served content may be a combination or compilation of website resources or parts of website resources. In one example, the combination or compilation may result in the website resources or parts being presented in a different format, encoding type or language.

In one example, each website resource 40 is of a type selected from a set including: media (such as audio, video or images); style settings (such as colour, font selection, layout); configuration settings (such as localization settings, website configuration, data for accessing other services and databases, security settings such as a htaccess file that can dictate IP addresses to allow/block, require secure connections, rewirte URLs etc); functional executable code (such as Javascript encoding website functionality, controllers, models, routes); renderable code (such as HTML); and, local and external services (for example services that execute substantially independently of the system 10 and provide data or other services to the website such as authentication or payment processing). It will be appreciated that website resources may be of other types.

FIG. 3a is a graphical illustration of a website framework of the system of FIG. 1. In discussing FIG. 3a, reference may be made to the diagrams of FIGS. 1 and, 2 to provide contextual examples. Implementation however, is not limited to those examples.

In one example, a website frame work 30 for a rebsite is in the form of two hierarchical trees 31, 35. In one example, a root tree 31 corresponds to a root website and an extension tree 35 corresponds to additions or substitutions to be applied to the root website to provide the website. In one example, nodes 31a, 31b, 31c, 31d, 35a, 35b of the trees correspond to website resources 40. In one example, nodes of the extension tree 35 are ranked or prioritized higher than nodes of the root tree 31. It will be appreciated that the website framework 30 need not be encoded as graphical trees and could be encoded in the form of nodes and pointers, links, stored in a database, a file and directory structure or in other ways.

Figure 3B:
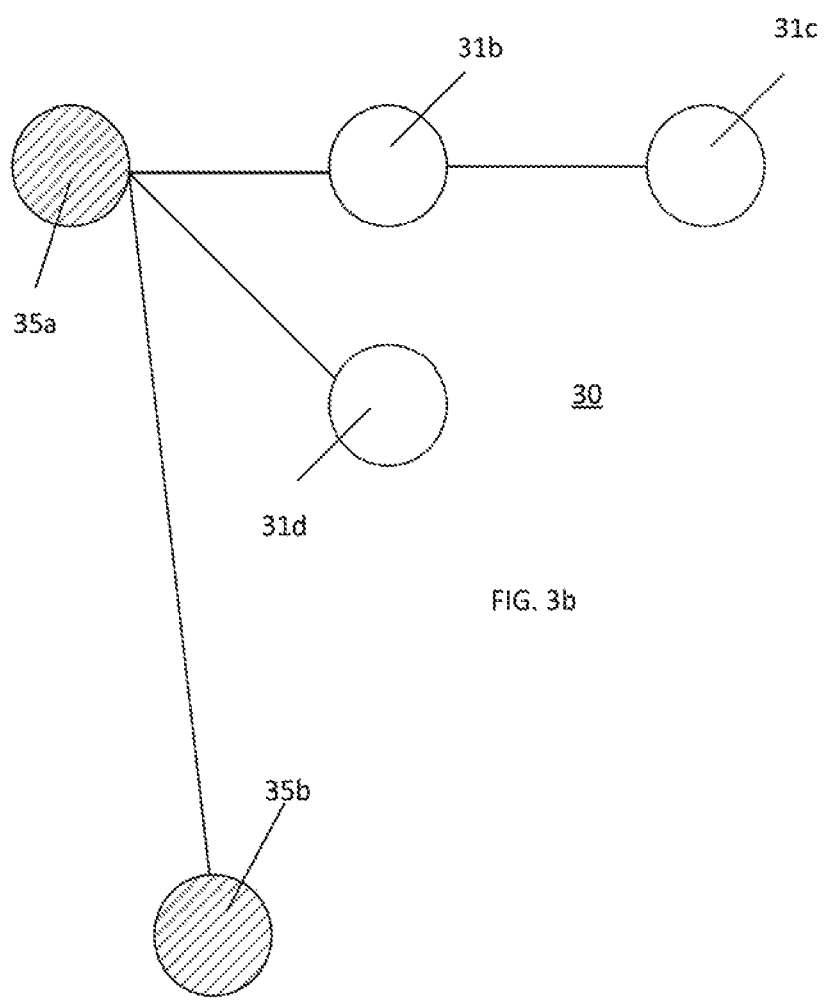

FIG. 3b is a graphical illustration of the website framework of FIG. 3a taking into account inheritance and superseding effect of the root 31 and extension 35 trees. Node 35a of the extension tree 35 supersedes node 31a of the root tree 31. Node 35b of the extension tree 35 has no corresponding node in the root tree and so extends the overall framework 30.

FIG. 4a is a graphical illustration of a website framework of the system of FIG. 1 or 2 but for the case where the system 10 hosts multiple websites 90a, 90b, 90c. In discussing FIG. 3a, reference may be made to the diagrams of FIGS. 1, 2, 3a and, 3b to provide contextual examples. Implementation, however, is not limited to those examples.

In this example, the website framework 30 identifies the applicability of the website resources 40 for the plurality of websites 90a, 90b, 90c. In this example, the dispatcher 70 of the system of FIG. 1 or 2 includes at least one processor to execute computer program code to determine one of the plurality of websites 90a, 90b, 90c to which the request relates to and to determine at least one of the website resources 40 in dependence on the website determined from the request.

In one example, each of the plurality of websites 90a, 90b, 90c is derived from a root website 91, the plurality of websites sharing at least one base level 31 in the website framework 30 which corresponds to the root website 91. In one example, websites 90a and 90b share an intermediate website framework 32.

In one example, each of the plurality of websites 90a, 90b, 90c has a corresponding extension website framework 33-35 that is ranked higher than the website framework 31 for the root website 91 and the intermediate website framework 32. In one example, the dispatcher 70 includes at least one processor to execute computer program code to select the vvebsite framework for the determined website (90a, 90b or 90c). In one example, the dispatcher 70 determines at least one of the website resources 40 corresponding to the request for content in dependence on the website framework 31 for the root website 91 supplemented by the website framework 32-35 for the determined website and intermediate website framework as indicated by the framework 30.

In one example, each website inherits website resources from the root website 91 unless there is a corresponding web resource 40 specified by its own framework 32-34 (or the intermediate framework 31 if applicable) in which case the higher rank web resource 40 is selected. By parsing the website framework of the root website 31 and the other applicable framework(s) (31-34) for the respective website, applicable website resources 40 can be determined (which effectively flattens the frameworks and removes superseded nodes) resulting in the resources for the website. In one example, parsing the framework is performed on demand in response to a request concerning the website.

In another example, a common framework 30 is shared by a number of websites, the nodes of the framework identifying the website to which they pertain. In this example, instead of splitting the framework 30 into a root framework and extension frameworks for specific websites (and optionally intermediate framework(s) that extend the root framework before themselves being extended by an extension framework for a specific website), some of all of the frameworks may be merged together. In this example, rather than the dispatcher 70 determining how to merge together the root and extension frameworks, it instead navigates the merged framework to determine which nodes apply to the website in question.

Figure 5:
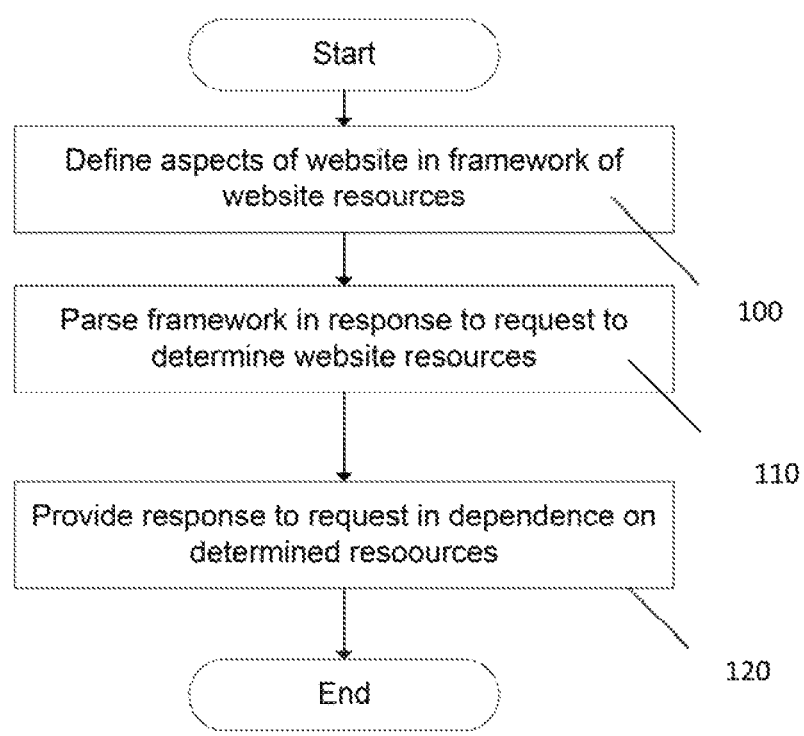
FIG. 5 is a flow diagram of a method of hosting a website, according to various examples.

FIG. 5 is a flow diagram of a method of hosting a website according to various examples.

Starting at step 100, at least aspects of a website are defined in a framework of website resources, the at least aspects of the website being, dependent on the website resources and their position in the framework.

At step 110, in response to a request concerning the website, the framework is parsed to determine at least one of the website resources for the request.

At step 120 a response is provided to the request n dependence on the determined website resource or resources.

FIG. 6 is a flow diagram of a method of hosting a website according to various examples.

Starting at step 100, at least aspects of a website are defined in a framework of website resources, the at least aspects of the website being dependent on the website resources and their position in the framework. In one example, the website framework comprises a hierarchy prioritizing the website resources. At step 101, each of the plurality of website resources are assigned to the hierarchy. At step 105, a website resource is specified in the website framework as an alternative to another website resource.

At step 110, in response to a request concerning the website, the framework is parsed to determine at least one of the website resources for the request including, at step 112, processing the hierarchy. At step 113, it is determined if alternative web resources specified at step 105 are relevant to the request and, of so, at step 114 the highest priority of the alternatives is selected At step 115, each highest priority website resource in the hierarchy relevant to the request is selected. It will be appreciated that, in one example, steps 113-115 can be combined.

At step 116, the selected website resources are compiled and a response to the request from the compiled website resources is provided at step 130. In one example, compiling the resources includes gathering them into a form that can be provided as a response. In one example, compiling the resources comprises serving the selected resource or resources (in their original form or in a changed form). In one example, compiling the resources may include combining code or mark-up into a combined response.

FIG. 7 is a flow diagram of a method hosting website according to various examples.

The method of FIG. 7 corresponds to of FIG. 6 except that a plurality of websites are hosted. At step 106, those of the plurality of websites to which each of the website resources applies is identified in the framework.

At step 111, one of the plurality of websites is determined from the request. Steps 112-115 are then performed with respect to the determined website.

In one example, at step 106, any of the website resources that are common to all of the websites may be identified as such in the framework (either explicitly or by absence of labelling to specific websites).

Figure 8A:
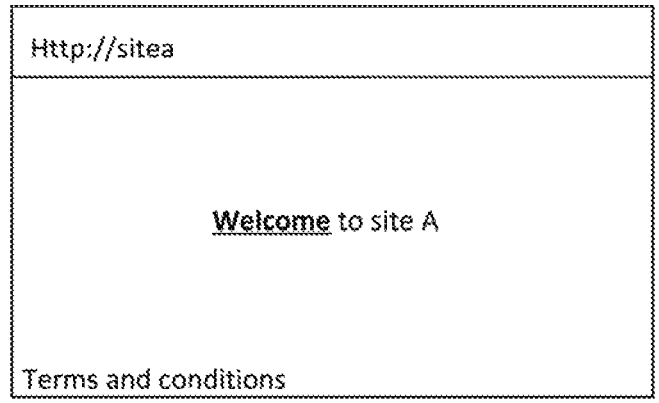
FIGS. 8a-8c are graphical illustrations of a page of a website produced by the system of FIG. 1.
Figure 8B:
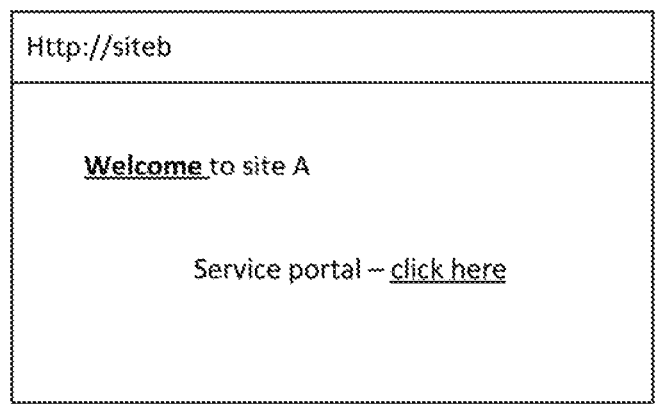
Figure 8C:
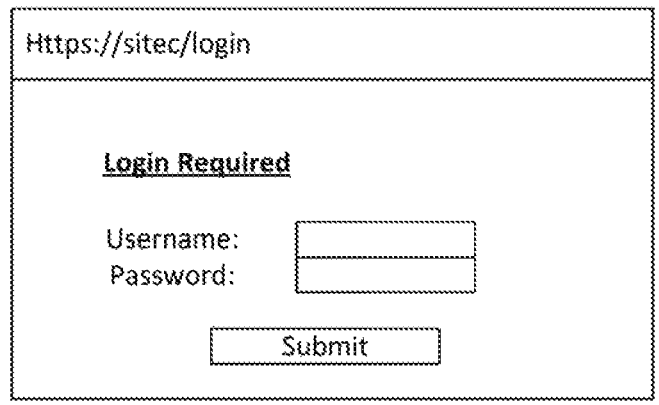

FIGS. 8a-8c are graphical illustrations of a page of a website produced by the system of FIG. 1. In discussing FIGS. 8a-8c, reference may be made to the diagrams of FIGS. 1, 2, 3a and 3b, 4a and 4b, 5, 6 and 7 to provide contextual examples. Implementation, however, is not limited to those examples.

In this example a root site is shown in FIG. 8a and extended sites inheriting from the root site are shown in FIGS. 8b and 8c. The root site of FIG. 8a has limited content and styling and branding. The website of FIG. 8b has an extension framework that supersedes some content of the root website and also redefines styling. The website of FIG. 8c has an extension framework that adds content and redefines configuration such that URLs are private and login via an HTTPS connection is mandatory.

The functions and operations described with respect to, for example, the dispatcher may be implemented as a computer-readable storage medium containing instructions executed by a processor and stored in a memory. Processor may represent generally any instruction execution system, such as a computer/processor based system or an ASIC (Application Specific Integrated Circuit), a Field Programmable Gate Array (FPGA), a computer, or other system that can fetch or obtain instructions or logic stored in memory and execute the instructions or logic contained therein. Memory represents generally any memory configured to store program instructions and other data.

Figure 9:
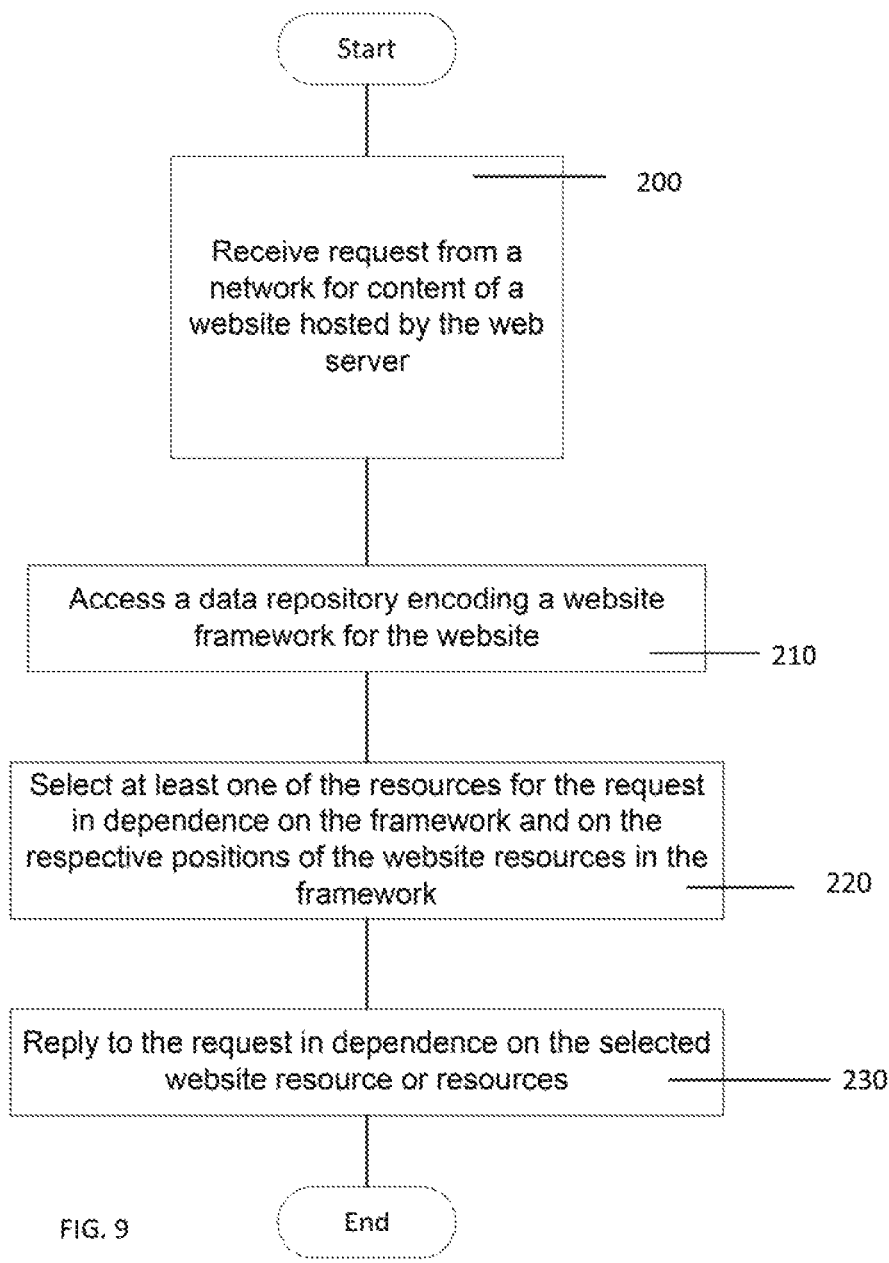
FIG. 9 is a flow diagram depicting a technique to control a web server according to various examples.

FIG. 9 is a flow diagram depicting a technique to control a web server according to various examples. In the technique, a request is received, from a network, a request for content of a website hosted by the web server at block 200. A data repository encoding a website framework for the website is accessed at block 210. Each of a plurality of website resources has a position in the framework. At block 220, at least one of the resources for the request is selected in dependence on the framework and on the respective positions of the website resources in the framework. At block 230, a reply is made to the request in dependence on the selected website resource or resources.

Various modifications may be made to the disclosed examples and implementations without departing from their scope. Therefore, the illustrations and examples herein should be construed in an illustrative, and not a restrictive, sense.

What is claimed is:

1. A system to serve content of a website, the system comprising:
   a data repository encoding a website framework, the website framework identifying:
      a plurality of website resources; and,
      the applicability of the website resources for the website;
   a network interface to receive, from a network, a request for content of the website;
   a dispatche including at least one processor to execute computer program code to receive the request for content from the network interface, to access the website framework in the data repository to determine, in dependence on said applicability, at least one of the website resources corresponding to the request for content, and to serve content in dependence on the determined website resource or resources.

2. The system of claim 1, wherein the website framework comprises a hierarchy, each of the plurality of website resources having a position in the hierarchy, the position of a website resource in the hierarchy with respect to the other website resources defining the applicability of the website resource for the website.

3. The system of claim 2, wherein the hierarchy has a plurality of levels, each level having a unique rank in the hierarchy, the position of each of the plurality of website resources comprising one of said levels and a website resource in a higher ranked level having priority in applicability for the website over a website resource of a lower ranked, a website resource being applicable for the website if no corresponding website resource at a higher ranked level exists in the hierarchy.

4. The system of claim 1, wherein each website resource is of a type selected from a set including media, style settings, configuration settings, functional executable code, renderable code, local services, and external services.

5. The system of claim 3, wherein the website framework identifies the applicability of the website resources for a plurality of websites, the dispatcher including at least one processor to execute computer program code to determine one of the plurality of websites from the request and to determine the at least one website resource in dependence on the website determined from the request.

6. The system of claim 5, wherein each of the plurality of websites is derived from a root website, the plurality of websites sharing at least one base level in the website framework which corresponds to the root website.

7. The system of claim 6, wherein each of the plurality of websites has a corresponding website framework that has levels ranked higher than the website framework for the root website, the dispatcher including at least one processor to execute computer program code to select the website framework for the determined website and to determine at least one of the website resources corresponding to the request for content in dependence on the website framework for the root website supplemented by the website framework for the determined website.

8. A method of hosting a website comprising:
   defining at least aspects of a website in a framework of website resources, the at least aspects of the website being dependent on the website resources and their position in the framework;
   in response to a request concerning the website, parsing the framework to determine at least one of the website resources for the request and providing a response to the request in dependence on said at least one website resource.

9. The method of claim 8, wherein the website framework comprises a hierarchy prioritising the website resources, the method further comprising:
   assigning each of the plurality of website resources to the hierarchy,
   wherein the step of parsing including processing the hierarchy and selecting each highest priority website resource in the hierarchy relevant to the request.

10. The method of claim 9, further comprising:
    specifying, in the website framework, a website resource as an alternative to another website resource, wherein where the alternatives are relevant to the request, the step of parsing including selecting the highest priority of the alternatives.

11. The method of claim 9, further comprising:
compiling the selected website resources and providing a response to the request from the compiled website resources.

12. The method of claim 8, wherein the step of defining further comprises defining at least aspects of a plurality of websites in the framework and identifying, in the framework, which of the plurality of websites each of the website resources applies to, the step of parsing further comprising:
determining one of the plurality of websites from the request and determine the at least one website resource in dependence on the website determined from the request.

13. The method of claim 12, wherein the step of identifying includes identifying, in the website framework, any of the website resources that are common to all of the websites.

14. A non-transitory computer-readable storage medium containing instructions to control web server, the instructions when executed by a processor causing the processor to:
receive, from a network, a request for content of a website hosted by the web server;
access a data repository encoding a website framework for the website, each of a plurality of website resources being positioned in the framework;
select at least one of the resources for the request in dependence on the framework and on respective positions of the website resources in the framework; and,
reply to the request in dependence on the at least one selected website resource.

15. The non-transitory computer readable storage medium of claim 14, further comprising instructions when executed by a processor cause the processor to:
determine which of a plurality of websites hosted by the web server the request pertains.

* * * * *